United States Patent [19]

Sato et al.

[11] Patent Number: 4,694,353
[45] Date of Patent: Sep. 15, 1987

[54] DIGITAL SCANNER

[75] Inventors: Tsutomu Sato, Yokohama; Noboru Murayama, Tokyo; Key Sato, Yokohama, all of Japan

[73] Assignee: Ricoh Company, Ltd., Tokyo, Japan

[21] Appl. No.: 804,541

[22] Filed: Dec. 4, 1985

[30] Foreign Application Priority Data

Dec. 6, 1984 [JP] Japan .................................. 59-258249

[51] Int. Cl.$^4$ ............................................. H04N 1/40
[52] U.S. Cl. .................................... 358/283; 358/294; 382/52
[58] Field of Search ................... 358/283, 294; 382/52

[56] References Cited

U.S. PATENT DOCUMENTS

| | | | |
|---|---|---|---|
| 4,475,127 | 10/1984 | Iinuma | 358/283 X |
| 4,496,987 | 1/1985 | Yuasa et al. | 358/283 |
| 4,549,220 | 10/1985 | Suzuki | 358/283 |
| 4,554,594 | 11/1985 | Ciardiello et al. | 358/283 |

Primary Examiner—Edward L. Coles, Sr.
Attorney, Agent, or Firm—Oblon, Fisher, Spivak, McClelland, & Maier

[57] ABSTRACT

A digital scanner installed in an image reader of a digital facsimile apparatus, a digital copier or the like includes an analog-to-digital converter for quantizing a video signal which is produced by reading a document. A threshold voltage applied to the analog-to-digital converter from the outside is variable and specified from the outside.

3 Claims, 9 Drawing Figures

DIGITAL SCANNER

BACKGROUND OF THE INVENTION

The present invention relates to a digital scanner installed in a facsimile apparatus, an electronic copier or the like for reading a document and, more particularly, to a technique for quantizing a video signal produced by scanning a document.

A digital scanner which has heretofore been built in an image reader of a digital copier and others includes a charge coupled device (CCD) for scanning a document and converting the resulting optical signal to an analog electrical signal, an amplifier for amplifying the analog signal to a certain level which is easy to process, and a peak hold circuit and an analog-to-digital (AD) converter which cooperate to convert the amplified analog signal to a digital signal using a predetermined threshold level. The problem with such a digital scanner is that since a predetermined threshold voltage applied to the AD converter is fixed, the number of bits for quantizing the signal is determined solely by the AD converter itself, that is, by the fixed predetermined threshold voltage.

Meanwhile, a two-level scanner heretofore built in a digital facsimile apparatus or the like also includes a CCD and an amplifier and, in addition, a comparator which receives an analog signal output from the amplifier at one of its input terminals. In such a two-level scanner, a fixed threshold voltage of a predetermined level is applied to the other input of the comparator and, hence, only a two-level signal processed with respect to the predetermined level can be produced from the comparator.

Any of the prior art scanners, therefore, is incapable of reading images carried on a document in multiple tones. An implementation for settling this situation has been keenly demanded in the imaging art.

SUMMARY OF THE INVENTION

It is therefore an object of the present invention to provide a solution to the above-described problem of the prior art scanners.

It is another object of the present invention to provide a scanner capable of reading images on a document in multiple tones.

It is another object of the present invention to provide a scanner capable of controlling the upper and lower threshold levels in the event of AD convertion of a video signal which is produced by scanning a document.

It is another object of the present invention to provide a generally improved scanner.

In one aspect of the present invention, there is provided a scanner for reading and quantizing images on a document in multiple tones which has a photoelectric transducer for reading the images and photoelectrically converting the images to produce an electrical signal, comprising an analog-to-digital converter for quantizing the electrical signal, and a threshold voltage setting circuit for specifying a threshold voltage which is applied to the analog-to-digital converter means.

In another aspect of the present invention, there is provided a scanner for reading and quantizing images on a document in multiple tones which has a photoelectric transducer for reading the images and photoelectrically converting the images to produce an electrical signal, comprising a comparator for binarizing the electrical signal, and a threshold voltage setting circuit for specifying a threshold voltage which is applied to the comparator.

In accordance with the present invention, a digital scanner installed in an image reader of a digital facsimile apparatus, a digital copier or the like includes an analog-to-digital converter for quantizing a video signal which is produced by reading a document. A threshold voltage applied to the analog-to-digital converter from the outside is variable and specified from the outside.

The above and other objects, features and advantages of the present invention will become more apparent from the following detailed description taken with the accompanying drawings.

DESCRIPTION OF THE PREFERRED EMBODIMENTS

While the scanner of the present invention is susceptible of numerous physical embodiments, depending upon the environment and requirements of use, substantial numbers of the herein shown and described embodiments have been made, tested and used, and all have performed in an eminently satisfactory manner.

To better understand the present invention, a brief reference will be made to prior art scanners, shown in FIGS. 1 and 2.

Figure 1:
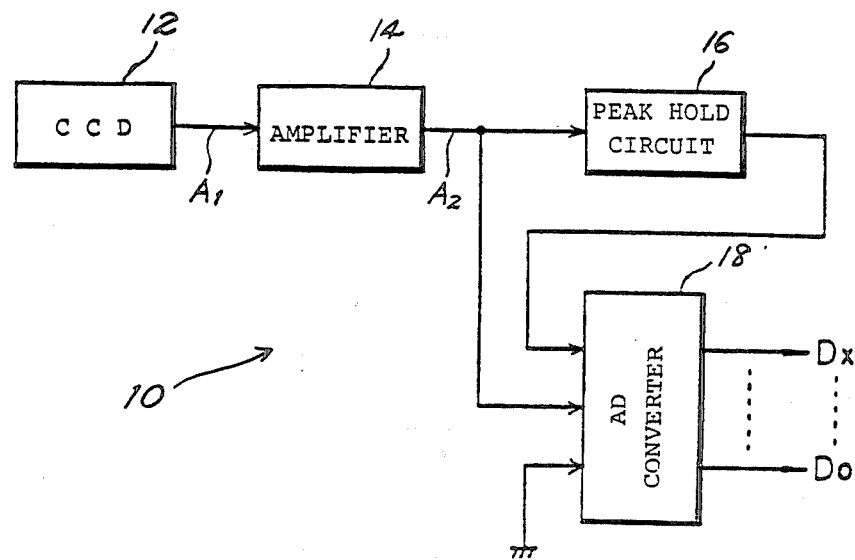
FIGS. 1 and 2 are block diagrams each showing a prior art scanner.

Referring to FIG. 1, a digital scanner which has heretofore implemented an image reader in a digital copier or the like is shown in a block diagram. The scanner, generaly 10, comprises a CCD 12, an amplifier 14, a peak hold circuit 16, and an AD converter 18. As well known in the art, the CCD 12 photoelectrically converts images on a document to produce an analog signal $A_1$, while the amplifier 14 amplifies the signal $A_1$ to a level which is easy to process. The output analog signal $A_2$ of the amplifier 14 is applied to the peak hold circuit 16 which then detects the peak of the signal $A_2$. The peak is determined as a white level, or background level. The AD converter 18 processes the analog signal $A_2$ with respect to the white level and a black level, thereby producing digital signals $D_o$-$D_x$. This type of digital scanner 10, however, has the drawback that since the upper and lower threshold voltages applied to the AD converter 18 are predetermined and unchangeable, the number of bits attainable in the event of quantizing the analog signal $A_2$ is determined by the AD converter 18 itself, that is, by the fixed levels.

Figure 2:
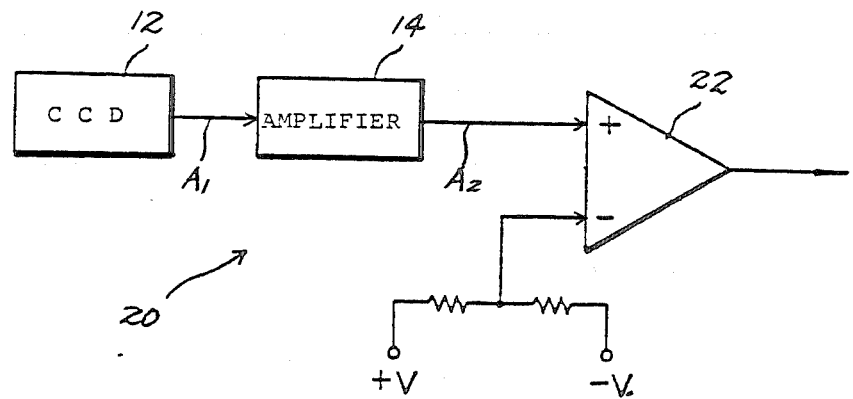

Referring to FIG. 2, a two-level scanner known in the art and installed in a digital facsimile apparatus or the like is shown. The two-level scanner, generally 20, comprises, in addition to the CCD 12 for generating an analog signal and the amplifier 14 for producing an analog signal $A_2$, a comparator 22 having a non-inverting input to which the analog signal $A_2$ is supplied. The scanner 20 has the drawback that since a threshold voltage constantly applied to an inverting input of the comparator 22 is predetermined, the comparator 22 can provide only the two levels which are decided with respect to the fixed reference level and, hence, the scanner 20 is incapable of reading document images in multiple tones.

Figure 3:
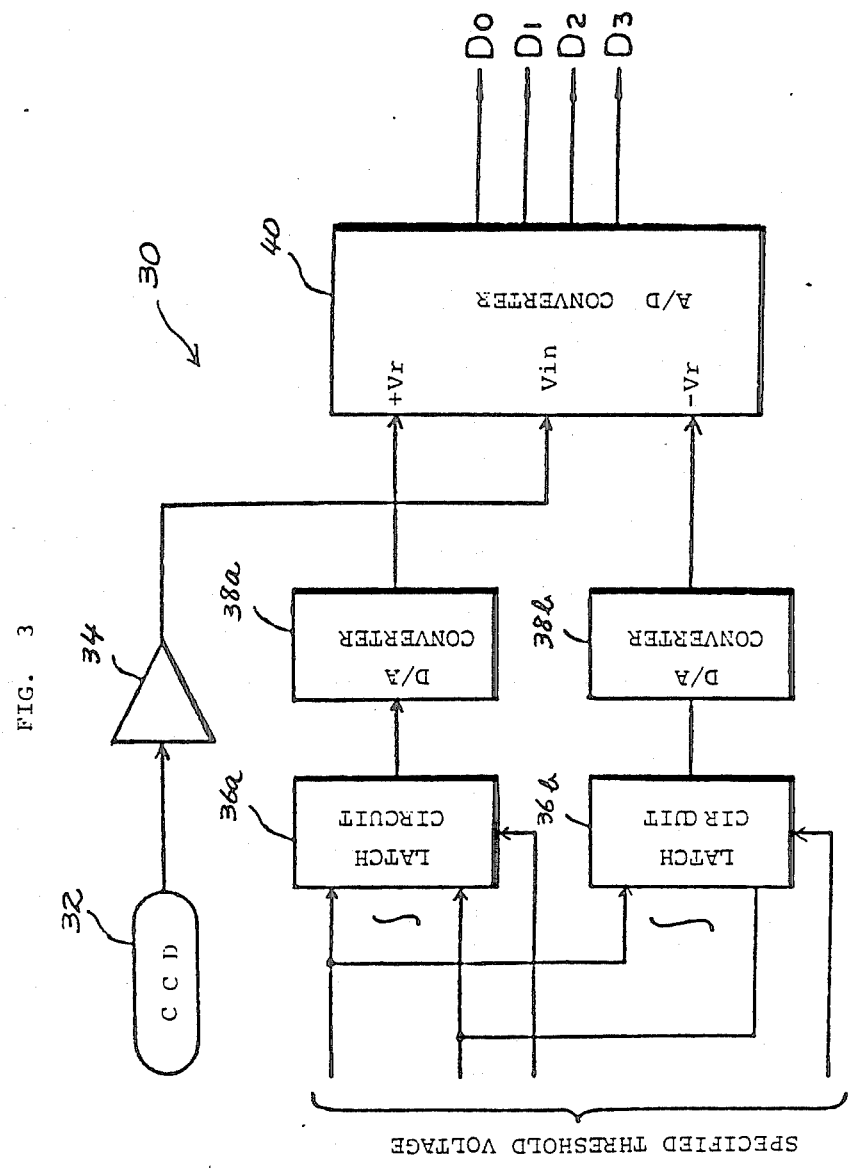
FIG. 3 is a block diagram showing a scanner embodying the present invention.

Referring to FIG. 3, a scanner embodying the present invention is shown and generally designated by the reference numeral 30. As shown, the scanner 30 comprises a CCD 32, an amplifier 34, latch circuits 36a and 36b, digital-to-analog (DA) converters 38a and 38b, and an AD converter 40. In the prior art scanner, as previously discussed, voltages $+Vr$ and $-Vr$ applied to the AD converter 40 in the illustrative embodiment, are fixed at certain levels. In accordance with the illustrative embodiment, the AD converter 40 is preceded by the latch circuits 36a and 36b each latching a particular threshold voltage, and the DA converters 38a and 38b adapted to convert the threshold levels of their associated latch circuits 36a and 36b to analog levels. The threshold voltages of the latch circuits 36a and 36b are each specified by a microcomputer or like external processing unit. That is, data are transferred to the latches 36a and 36b responsive to input/output (I/O) commands and others from the microcomputer. Outputs $D_0$–$D_3$ of the AD converter 40 may be fed to a personal computer or like external device for further increasing the applicable range of the scanner 30.

Figure 4:
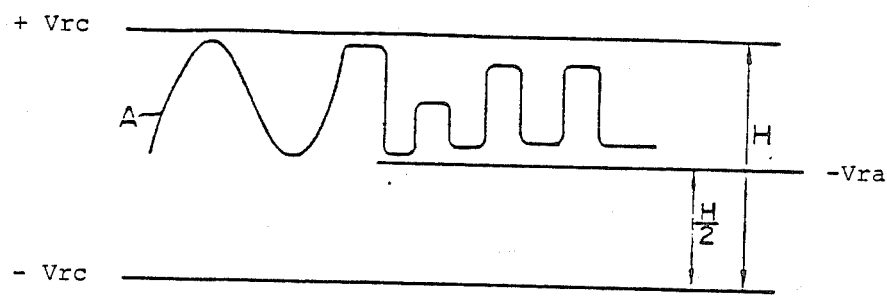
FIGS. 4 and 5 show signal waveforms representative of the operation of the scanner shown in FIG. 3.

Referring to FIG. 4, the operation of the scanner 30 in accordance with the present invention is demonstrated. Initially, a video input signal A is quantized in four bits to sixteen tones with respect to the threshold voltages $+Vrc$ and $-Vrc$, while the quantized values are checked by a central processing unit (CPU) or the like. As shown in FIG. 4, assuming that the video input signal A lies in that range between the threshold voltages which is close to the upper threshold voltage $+Vrc$, replacing the lower threshold voltage $-Vrc$ with another lower threshold voltage $-Vra$ is effective to nominally set up a ONE in the fifth bit such as "1, $D_3$, $D_2$, $D_1$, $D_0$". A four-bit AD converter, therefore, is capable of quantizing an input signal in five bits in total. Likewise, if the peak of the highest level of the video input signal A is used as the upper threshold voltage $+Vrc$ and the lowest level as the lower threshold voltage $-Vrc$, the signal A will be effectively quantized.

Figure 5:
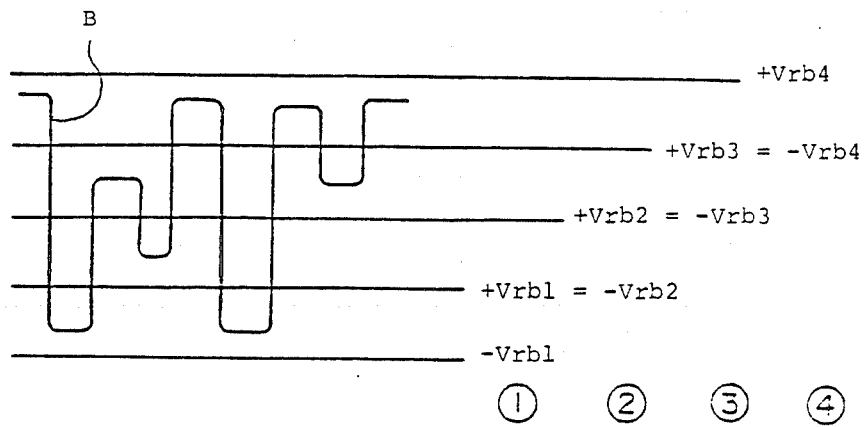

Referring to FIG. 5, there is shown a method of quantizing a video input signal in six bits by scanning a document four consecutive times while varying the threshold voltages, by means of a four-bit AD converter. Specifically, a video signal B is quantized using four equally divided thrshold zones. For the first conversion, the lowest level is used as the threshold level $-Vr$ and a quater level as the threshold level $+Vr$. For the second conversion, the quater level is used as the threshold level $-Vr$ and a half level as the threshold level $+Vr$. The third and fourth conversions are each effected based on the same principle. In this manner, a document is scannned four times in total. Thereafter, when processed by a CPU, the video signal B is quantized in six bits to sixty-four tones. Such a procedure allows an inexpensive low-level AD converter to serve as a multi-tone scanner and, in addition, allows a user to control the upper and lower threshold voltages to process images as desired.

Figure 6:
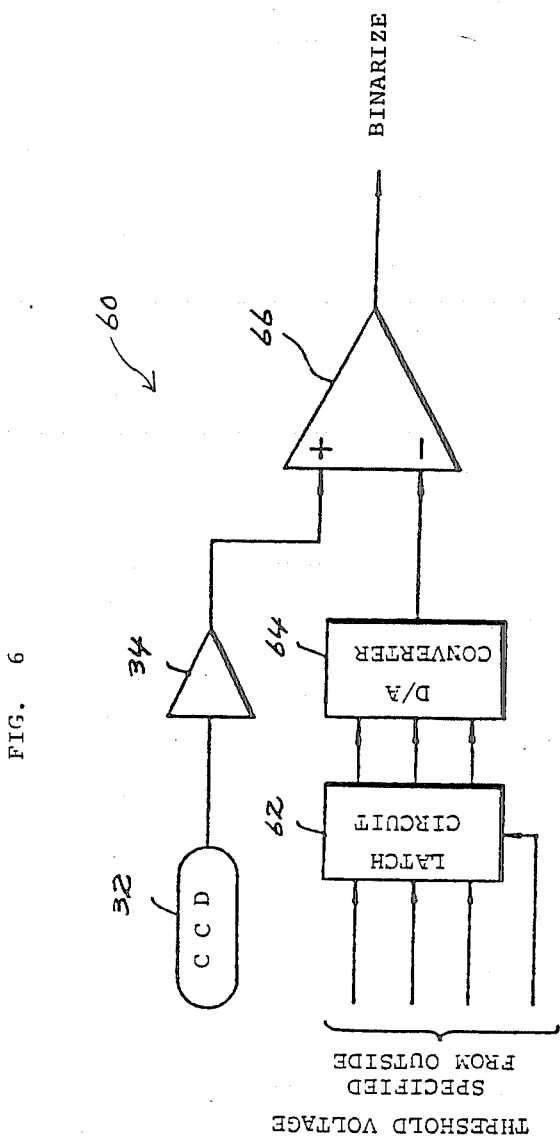
FIG. 6 is a block diagram showing another embodiment of the present invention.
Figure 7A:
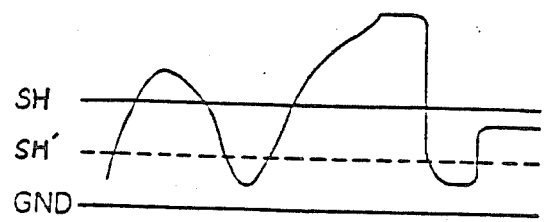
FIGS. 7A, 7B and 8 show signal waveforms representative of the operation of the scanner shown in FIG. 6.
Figure 7B:
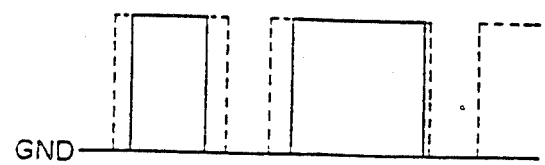

Referring to FIG. 6, another embodiment of the scanner of the present invention is shown. In FIG. 6, the same or similar structural elements as those shown in FIG. 3 are designated by like reference numerals. The scanner, generally 60, comprises a CCD 32, an amplifier 34, a latch circuit 62, a DA converter 64, and a comparator 66. In the scanner 60, the CCD 32 reads a document and the amplifier 34 amplifies an output of the CCD 32 to binarize it. In this connection, it has been customary, as represented by a solid line in FIG. 7A, to use a fixed threshold voltage SH, in which case a CCD output is binarized as represented by a solid line in FIG. 7B. In contrast, in this particular embodiment, the threshold voltage SH is variable. Specifically, the threshold hold voltage SH is variable to a threshold voltage SH' as represented by a phantom line in FIG. 7A so as to provide an output waveform as represented by a phantom line in FIG. 7B. Controlling the threshold voltage SH as mentioned is successfull to change images. Therefore, the processing with a variable threshold level SH allows document images to be read in multiple tones.

Figure 8:
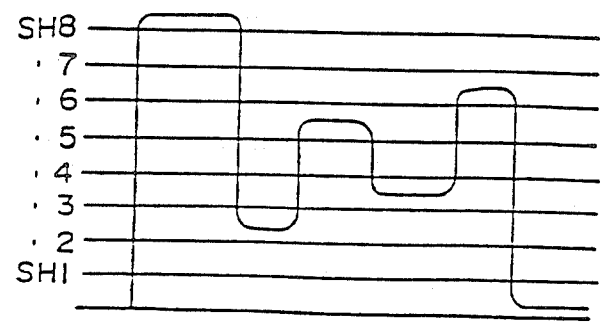

As shown in FIG. 8, the threshold voltage SH in accordance with this particular embodiment may be varied eight consecutive times as SH1-SH8. The scanner 60 which processes an input video signal with eight different threshold voltages as shown and described serves as a scanner capable of providing document images in eight consecutive tones. The operation starts with setting a code representative of the threshold voltage $SH_1$ in the latch 62 from the outside. This value in the latch 62 is converted by the DA converter 64 to an analog signal and, then, applied to the comparator 66. The comparator 66 compares an output of the amplifier 34 with the analog output of the DA converter 64, thereby binarizing the former. Such a procedure is repeated by sequentially changing the threshold voltage to SH2, SH3, SH4, SH5, SH6, SH7 and SH8. The output levels of the comparator 66 are decided as shown in Table below. In this manner, a scanner capable of reading only two levels is enabled to serve as a multi-tone scanner, eight-tone scanner in this example, by varying the threshold voltage from the outside.

TABLE

| THRESHOLD VOLTAGE | OUTPUT |
| --- | --- |
| S H 1 | 0 1 1 1 1 1 1 1 |
| S H 2 | 0 0 1 1 1 1 1 1 |
| S H 3 | 0 0 0 1 1 1 1 1 |
| S H 4 | 0 0 0 0 1 1 1 1 |
| S H 5 | 0 0 0 0 0 1 1 1 |
| S H 6 | 0 0 0 0 0 0 1 1 |
| S H 7 | 0 0 0 0 0 0 0 1 |
| S H 8 | 0 0 0 0 0 0 0 0 |
| EIGHT-TONE VALUE | 0 1 2 3 4 5 6 7 |

In summary, it will be seen that the present invention provides a scanner which, despite the use of an inexpensive low-level AD converter, serves as a multi-tone scanner and, moreover, allows a user to change the upper and lower threshold voltages to attain various kinds of image processing. In addition, the multi-tone scanner function is achievable in a simple and cost-effective manner merely by controlling from the outside the threshold voltages of a conventional scanner which reads two levels only.

Various modifications will become possible for those skilled in the art after receiving the teachings of the present disclosure without departing from the scope thereof.

What is claimed is:

1. A scanner for reading and quantizing images on a document in multiple tones, comprising:
- a photoelectric transducer for reading the images and photoelectrically converting the images to produce an electrical signal;
- means for producing two digital signals for specifying an upper threshold voltage level and a lower threshold voltage level;
- a first latch means and a second latch means connected to said means for producing two digital signals for receiving said two digital signals and for storing said signals therein;
- two digital-to-analog converters, each connected to a respective latch means for receiving said digital signals and for converting said digital signals to an upper threshold voltage level signal and a lower threshold voltage level signal;
- an analog-to-digital converter connected to said digital-to-analog converters and to said photoelectric transducer for receiving said electrical signal at a signal input terminal, said upper threshold voltage level signal at an upper threshold input terminal and said lower threshold voltage level signal at a lower threshold input terminal;
- wherein the means for producing two digital signals is constructed to determine a regular upper and a regular lower threshold voltage level for reading the image next time, based on data produced by reading a single line or a plurality of lines of the images with respect to a particular upper and a particular lower threshold voltage level.

2. A scanner for reading and quantizing images on a document in multiple tones, comprising:
- a photoelectric transducer for reading the images and photoelectrically converting the images to produce an electrical signal;
- means for producing two digital signals for specifying an upper threshold voltage level and a lower threshold voltage level;
- a first latch means and a second latch means connected to said means for producing two digital signals for receiving said two digital signals and for storing said signals therein;
- two digital-to-analog converters, each connected to a respective latch means for receiving said digital signals and for converting said digital signals to an upper threshold voltage level signal and a lower threshold voltage level signal;
- an analog-to-digital converter connected to said digital-to-analog converters and to said photoelectric transducer for receiving said electrical signal at a signal input terminal, said upper threshold voltage level signal at an upper threshold input terminal and said lower threshold voltage level signal at a lower threshold input terminal;
- wherein the means for producing is constructed to vary the upper and the lower threshold voltages for reading the same line or same document.

3. A scanner for reading and quantizing images on a document in multiple tones, comprising:
- a photoelectric transducer for reading the images and photoelectrically converting the images to produce an electrical signal,
- means for producing a digital signal for specifying a threshold voltage level;
- a latch means connected to said means for producing a digital signal for receiving a digital signal and for storing said signals therein;
- a digital-to-analog converter connected to said latch means for receiving said digital signal and for converting said digital signal to a threshold voltage level signal;
- comparator means connected to said photoelectric transducer and said digital-to-analog converter for receiving said electrical signal and said threshold voltage signal and for producing an output as a result of the comparison of the two signals;
- wherein said means for producing a digital signal is constructed to vary a level of the threshold voltage applied to the comparator in order to read a same line of the images or a same document a plurality of consecutive times.

* * * * *